(12) United States Patent
Armstrong (10) Patent No.: US 11,786,970 B2
(45) Date of Patent: *Oct. 17, 2023

(54) METHOD OF FABRICATING AN INTERCONNECT FOR A FUEL CELL STACK

(71) Applicant: BLOOM ENERGY CORPORATION, San Jose, CA (US)

(72) Inventor: Tad Armstrong, Burlingame, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,784

(22) Filed: Jul. 8, 2022

(65) Prior Publication Data

US 2022/0344676 A1    Oct. 27, 2022

Related U.S. Application Data

(62) Division of application No. 16/110,310, filed on Aug. 23, 2018, now Pat. No. 11,417,894, which is a (Continued)

(51) Int. Cl.
*B22F 5/00* (2006.01)
*B22F 7/02* (2006.01)
(Continued)

(52) U.S. Cl.
CPC .................. *B22F 7/04* (2013.01); *B22F 7/02* (2013.01); *H01M 8/021* (2013.01);
(Continued)

(58) Field of Classification Search
CPC .......... H01M 50/40–409; H01M 50/431–434; H01M 50/443; H01M 50/463;
(Continued)

(56) References Cited

U.S. PATENT DOCUMENTS 3,874,938 A    4/1975 Benjamin et al.
4,135,041 A    1/1979 Jung et al.
(Continued)

FOREIGN PATENT DOCUMENTS

CN    101438439 A    5/2009
CN    1697229 A    11/2015
(Continued)

OTHER PUBLICATIONS

Haynes International High-Temperature Alloys, "HAYNES (Reg.) 214 (TM) alloy", 1996, pp. 1-19.
(Continued)

*Primary Examiner* — Jonathan Crepeau
*Assistant Examiner* — Jacob Buchanan
(74) *Attorney, Agent, or Firm* — THE MARBURY LAW GROUP PLLC (57) ABSTRACT

Methods for fabricating an interconnect for a fuel cell stack that include providing a protective layer over at least one surface of an interconnect formed by powder pressing pre-alloyed particles containing two or more metal elements and annealing the interconnect and the protective layer at elevated temperature to bond the protective layer to the at least one surface of the interconnect.

13 Claims, 8 Drawing Sheets

Related U.S. Application Data division of application No. 14/592,338, filed on Jan. 8, 2015, now Pat. No. 10,079,393.

(60) Provisional application No. 61/925,383, filed on Jan. 9, 2014.

(51) Int. Cl.

| | | |
|---|---|---|
| *C22C 1/04* | (2023.01) | |
| *H01M 8/0206* | (2016.01) | |
| *H01M 8/12* | (2016.01) | |
| *B22F 7/04* | (2006.01) | |
| *H01M 8/0202* | (2016.01) | |
| *H01M 8/0217* | (2016.01) | |
| *H01M 8/021* | (2016.01) | |
| *H01M 8/0228* | (2016.01) | |
| *B22F 7/00* | (2006.01) | |
| *B22F 3/24* | (2006.01) | |
| *C22C 33/02* | (2006.01) | |

(52) U.S. Cl.
CPC ....... *H01M 8/0202* (2013.01); *H01M 8/0206* (2013.01); *H01M 8/0217* (2013.01); *H01M 8/0228* (2013.01); *B22F 5/006* (2013.01); *B22F 7/008* (2013.01); *B22F 2003/248* (2013.01); *B22F 2007/045* (2013.01); *B22F 2998/10* (2013.01); *B22F 2999/00* (2013.01); *C22C 1/0408* (2013.01); *C22C 1/0433* (2013.01); *C22C 33/0207* (2013.01); *H01M 2008/1293* (2013.01)

(58) Field of Classification Search
CPC ........... H01M 50/50–503; H01M 50/514–517; H01M 50/521–522; H01M 50/528; H01M 8/02–0269; H01M 8/12; C22C 1/04–0441; B22F 5/00–007; B22F 7/00–04
See application file for complete search history.

(56) References Cited

U.S. PATENT DOCUMENTS

| | | |
|---|---|---|
| 4,755,429 A | 7/1988 | Nickols et al. |
| 4,913,982 A | 4/1990 | Kotchick et al. |
| 5,162,167 A | 11/1992 | Minh et al. |
| 5,213,910 A | 5/1993 | Yamada |
| 5,215,946 A | 6/1993 | Minh |
| 5,248,712 A | 9/1993 | Takeuchi et al. |
| 5,256,499 A | 10/1993 | Minh et al. |
| 5,273,837 A | 12/1993 | Aiken et al. |
| 5,290,642 A | 3/1994 | Minh et al. |
| 5,342,705 A | 8/1994 | Minh et al. |
| 5,368,667 A | 11/1994 | Minh et al. |
| 5,382,315 A | 1/1995 | Kumar |
| 5,453,331 A | 9/1995 | Bloom et al. |
| 5,476,248 A | 12/1995 | Kobayashi et al. |
| 5,494,700 A | 2/1996 | Anderson et al. |
| 5,501,914 A | 3/1996 | Satake et al. |
| 5,518,829 A | 5/1996 | Satake et al. |
| 5,589,017 A | 12/1996 | Minh |
| 5,641,585 A | 6/1997 | Lessing et al. |
| 5,733,499 A | 3/1998 | Takeuchi et al. |
| 5,942,349 A | 8/1999 | Badwal et al. |
| 5,955,392 A | 9/1999 | Takeuchi et al. |
| 6,001,761 A | 12/1999 | Hata et al. |
| 6,361,892 B1 | 3/2002 | Ruhl et al. |
| 6,492,053 B1 | 12/2002 | Donelson et al. |
| 6,582,845 B2 | 6/2003 | Helfinstine et al. |
| 6,589,681 B1 | 7/2003 | Yamanis |
| 6,638,575 B1 | 10/2003 | Chen et al. |
| 6,835,488 B2 | 12/2004 | Sasahara et al. |
| 7,045,237 B2 | 5/2006 | Sridhar et al. |
| 7,390,456 B2 | 6/2008 | Glatz et al. |
| 8,241,817 B2 | 8/2012 | Yang et al. |
| 8,663,869 B2 | 3/2014 | Janousek et al. |
| 8,840,833 B1 | 9/2014 | Janousek et al. |
| 8,962,219 B2 | 2/2015 | Couse et al. |
| 9,452,475 B2 | 9/2016 | Armstrong et al. |
| 9,634,335 B2 | 4/2017 | Ashary |
| 10,079,393 B1 | 9/2018 | Verma et al. |
| 2002/0012825 A1 | 1/2002 | Sasahara et al. |
| 2002/0132156 A1 | 9/2002 | Ruhl et al. |
| 2003/0170527 A1 | 9/2003 | Finn et al. |
| 2003/0180602 A1 | 9/2003 | Finn |
| 2004/0101742 A1 | 5/2004 | Simpkins et al. |
| 2004/0200187 A1 | 10/2004 | Warrier et al. |
| 2005/0017055 A1 | 1/2005 | Kurz et al. |
| 2005/0084725 A1 | 4/2005 | Arthur et al. |
| 2005/0136312 A1 | 6/2005 | Bourgeois et al. |
| 2005/0227134 A1 | 10/2005 | Nguyen |
| 2005/0255355 A1 | 11/2005 | Ukai et al. |
| 2006/0172168 A1 | 8/2006 | Wright et al. |
| 2006/0192323 A1 | 8/2006 | Zobl et al. |
| 2006/0193971 A1 | 8/2006 | Tietz et al. |
| 2007/0134532 A1 | 6/2007 | Jacobson et al. |
| 2007/0151415 A1 | 7/2007 | Chun et al. |
| 2007/0190391 A1 | 8/2007 | Otschik et al. |
| 2007/0207375 A1 | 9/2007 | Jacobson et al. |
| 2007/0231676 A1 | 10/2007 | Cassidy et al. |
| 2007/0237999 A1 | 10/2007 | Donahue et al. |
| 2008/0081223 A1 | 4/2008 | Yasumoto et al. |
| 2008/0199738 A1 | 8/2008 | Perry et al. |
| 2009/0004547 A1 | 1/2009 | Vitella et al. |
| 2009/0117441 A1 | 5/2009 | Suzuki et al. |
| 2009/0162236 A1 | 6/2009 | Hammond et al. |
| 2009/0220833 A1 | 9/2009 | Jones et al. |
| 2009/0246636 A1 | 10/2009 | Chiang et al. |
| 2010/0015473 A1 | 1/2010 | Hendriksen et al. |
| 2010/0092328 A1 | 4/2010 | Thomas et al. |
| 2010/0119886 A1 | 5/2010 | Nielsen et al. |
| 2010/0119917 A1 | 5/2010 | Kumar et al. |
| 2010/0178589 A1 | 7/2010 | Kwon et al. |
| 2011/0135531 A1 | 6/2011 | Hsu et al. |
| 2011/0143261 A1 | 6/2011 | Brandner et al. |
| 2011/0223510 A1 | 9/2011 | Horst et al. |
| 2011/0287340 A1 | 11/2011 | Mougin et al. |
| 2012/0121999 A1* | 5/2012 | Laurencin ........... H01M 4/8642 429/480 |
| 2012/0295183 A1* | 11/2012 | Yamanis ............. H01M 8/0228 156/283 |
| 2013/0129557 A1 | 5/2013 | Herchen et al. |
| 2013/0130146 A1 | 5/2013 | Batawi et al. |
| 2013/0130154 A1 | 5/2013 | Darga et al. |
| 2013/0216927 A1 | 8/2013 | Gottmann et al. |
| 2013/0230644 A1 | 9/2013 | Armstrong et al. |
| 2013/0230792 A1 | 9/2013 | Wilson et al. |
| 2014/0342267 A1 | 11/2014 | Parihar et al. |
| 2015/0110665 A1 | 4/2015 | Herchen et al. |
| 2016/0020471 A1 | 1/2016 | Wilson et al. |
| 2018/0366743 A1 | 12/2018 | Armstrong |

FOREIGN PATENT DOCUMENTS

| | | |
|---|---|---|
| EP | 0615299 A1 | 9/1994 |
| EP | 1098380 | 5/2001 |
| JP | 06-215778 | 8/1994 |
| JP | 09-199143 | 7/1997 |
| JP | 09-223506 | 8/1997 |
| JP | 09-245810 | 9/1997 |
| JP | 09-245811 | 9/1997 |
| JP | 09-277226 | 10/1997 |
| JP | 2000-281438 | 10/2000 |
| JP | 2010-113955 | 5/2010 |
| TW | 201119771 A | 6/2011 |
| WO | WO2006/016628 A1 | 2/2006 |

(56) References Cited

FOREIGN PATENT DOCUMENTS

| WO | WO2011/096939 A1 | 8/2011 |
|---|---|---|
| WO | WO2013/130515 A1 | 9/2013 |

OTHER PUBLICATIONS

Haynes International High-Temperature Alloys, "HAYNES (Reg.) 230(TM) alloy", 2004, pp. 1-27.
International Search Report & Written Opinion, International Application No. PCT/US2007/08224, dated Nov. 26, 2008, 10 pgs.
International Search Report, International Application No. PCT/US2003/04808, dated Aug. 19, 2003, 9pgs.
Supplementary European Search Report, International Application No. PCT/US2003/04808, dated Jun. 2, 2008, 3pgs.
International Search Report & Written Opinion, International Application No. PCT/US2010/027899, dated Oct. 20, 2010, 11pgs.
International Preliminary Report on Patentability, International Application No. PCT/US2010/027899, dated Sep. 20, 2011, 6pgs.
International Search Report & Written Opinion issued in PCT Application No. PCT/US2012/065508, dated Mar. 29, 2013.
International Search Report & Written Opinion issued in PCT Application No. PCT/US2012/065531, dated Mar. 29, 2013.
Fergus, "Metallic Interconnects for Solid Oxide Fuel Cells," Materials Science and Engineering: A, vol. 397, Issues 1-2, Apr. 25, 2005, pp. 271-283, ISSN 0921-5093.
Nagarathnam et al., Proc. Of International Conference on Powder Metallurgy & Particulate Materials, Chicago, IL, Utron Inc., n.d. Web. Jul. 24, 2015.
International Preliminary Report on Patentability, International Application No. PCT/US2012/065508, dated May 30, 2014.
International Preliminary Report on Patentability, International Application No. PCT/US2012/065531, dated May 30, 2014.
Search Report for Taiwanese Application No. CN 102107116, dated Jun. 29, 2016, 2 pages.
First Office Action for Taiwanese Application No. CN 102107116, dated Jun. 29, 2016, 7 pages.
Seabaugh, M. et al., "Oxide Protective Coatings for Solid Oxide Fuel Cell Interconnects," ECS Trans., vol. 35, No. 1, 10 pages, (2011).
Non-Final Office Communication for U.S. Appl. No. 13/409,629, filed Mar. 1, 2012, dated Oct. 21, 2015, (44 pages).
Garcia-Vargas, et al., "Use of SOFC Metallic Interconnect Coasted with Spinel Protective Layers Using the APS Technology," ECS Transactions, vol. 7, No. 1, pp. 2399-2405, (2007).
Yang, et al., "(Mn, Co)3O4 Spinel Coatings on Ferritic Stainless Steels for SOFC Interconnect Applications," International Journal of Hydrogen Energy, vol. 32, pp. 3648-3654, (2007).
Saoutieff, et al., "APS Deposition of MnCo2o4 on Commercial Alloys K41X Used as Solid Oxide Fuel Cell Interconnect: The Importance of Post Heat-Treatment for Densification of the Protective Layer," ECS Transactions, vol. 25, No. 2, pp. 13907-1402, (2009).
International Preliminary Report on Patentability received in connection with international application No. PCT/US2013/027895; dated Sep. 12, 2014.
International Search Report and Written Opinion received in connection with international application No. PCT/US2013/027895; dated Jun. 24, 2013.
Stevenson et al., "SECA Core Technology Program: Materials Development at PNNL," Pacific Northwest National Laboratory, Richland, WA, SECA Core Technology Review Meeting, Lakewood, CO, Oct. 25, 2005.
La O', G. J. et al., "Investigation of Oxygen Reduction Mechanisms Using Cathode Microelectrodes Part I: Experimental Analysis of La1-xSrxMnO3-d and Platinum," 207th Meeting of the Electrochemical Society, Quebec City, CANADA, May 15-20, 2005.
International Application No. PCT/US13/27895, International Filing Date: Feb. 27, 2013, "Coatings for SOFC Metallic Interconnects," Bloom Energy Corporation, Specification and drawings, 67pgs.

\* cited by examiner

METHOD OF FABRICATING AN INTERCONNECT FOR A FUEL CELL STACK

RELATED APPLICATION

This application is a divisional of U.S. application Ser. No. 16/110,310, filed Aug. 23, 2018, which is a divisional of U.S. application Ser. No. 14/592,338, filed Jan. 8, 2015, now U.S. Pat. No. 10,079,393, which claims the benefit of priority to U.S. Provisional Application No. 61/925,383, filed Jan. 9, 2014, the entire contents of which are incorporated herein by reference.

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

In order to optimize the operation of SOFCs, the oxidizing and fuel flows should be precisely regulated. Therefore, the flow regulating structures, such as interconnects in the fuel cell system should be precisely manufactured.

SUMMARY

Embodiments include methods for fabricating an interconnect for a fuel cell stack that include providing a protective layer over at least one surface of an interconnect formed by powder pressing pre-alloyed particles containing two or more metal elements, and annealing the interconnect and the protective layer at elevated temperature to bond the protective layer to the at least one surface of the interconnect. The protective layer is provided over the at least one surface of the interconnect without first sintering the pressed powder interconnect.

Another embodiment includes a method of fabricating an interconnect for a fuel cell stack, comprising providing a protective layer over at least one surface of an interconnect formed by powder pressing pre-alloyed particles containing two or more metal elements, where the protective layer is provided over the at least one surface of the interconnect without first sintering the pressed powder interconnect, annealing the interconnect and the protective layer at elevated temperature to bond the protective layer to the at least one surface of the interconnect, incorporating the annealed interconnect into a fuel cell stack, and annealing the interconnect in the fuel cell stack at elevated temperature in an oxygen containing environment to reduce a porosity of the interconnect.

Another embodiment includes a method of fabricating an interconnect for a fuel cell stack, comprising incorporating an interconnect formed by powder metallurgy into a fuel cell stack, and annealing the interconnect in the fuel cell stack at elevated temperature in an oxygen containing environment to oxidize both surfaces and an interior volume of the interconnect to reduce a porosity of the interconnect.

In various embodiments, the protective layer may comprise a manganese cobalt oxide (MCO) material, such as an $(Mn, Co)_3O_4$ spinel, or another metal oxide, such as a perovskite (e.g., lanthanum strontium manganite, (LSM)), a mixture thereof, and/or several sublayers thereof, provided over at least the cathode (i.e., air) facing side of the interconnect. The protective layer may be provided on the interconnect without the interconnect first undergoing a separate sintering step, a controlled pre-oxidation step and/or a surface oxide removal step. The interconnect and the protective layer may be annealed at a temperature of 950-1000° C. and incorporated into a fuel cell stack. The interconnect may be annealed in the stack in an oxygen-containing environment in conjunction with a stack sintering process to form seals between the interconnects and the fuel cells in the stack.

The pre-alloyed particles used to form the interconnect may be comprised of a plurality of individual particles having a mean and/or median dimensional size (e.g., diameter) that is less than about 30 μm (e.g., 5-30 μm, such as about 10-20 μm) which are agglomerated to form agglomerated particle clusters having a mean and/or median dimensional size (e.g., diameter) that is between about 110-160 μm (e.g., 130-140 μm). In some embodiments, the pre-alloyed particles may comprise individual (i.e., non-agglomerated) pre-alloyed particles comprising two or more metal elements (e.g., Cr and Fe) and having a mean and/or median dimensional size (e.g., diameter) that is between about 110-160 μm (e.g., 130-140 μm).

Another embodiment includes a method of fabricating an interconnect for a fuel cell stack that includes providing a first metal powder including at least one first metal material in a die cavity of a powder press apparatus, providing a second metal powder including at least one second metal material over the first metal powder in the die cavity of the powder press apparatus, wherein the at least one second metal material is different than the at least one first metal material, compressing the first metal powder and the second metal powder in the powder press apparatus to form a pressed powder interconnect, and subjecting the pressed powder interconnect to an oxygen-containing environment at an elevated temperature to oxidize at least a portion of the at least one second metal material and form a metal oxide protective layer over a surface of the pressed powder interconnect.

Another embodiment includes a method of fabricating an interconnect for a fuel cell stack that includes providing a powder mixture including chromium and at least two other metals in a die cavity of a powder press apparatus, compressing the powder mixture in the powder press apparatus to form a pressed powder interconnect, and oxidizing the pressed powder interconnect in an oxygen-containing environment at an elevated temperature to oxidize the at least two other metals and form a metal oxide protective layer over at least one surface of the pressed powder interconnect.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawing. Wherever possible, the same reference numbers will be used throughout the drawing to refer to the same or like parts. References made to particular examples and implementations are for illustrative purposes, and are not intended to limit the scope of the invention or the claims.

Figure 1A:
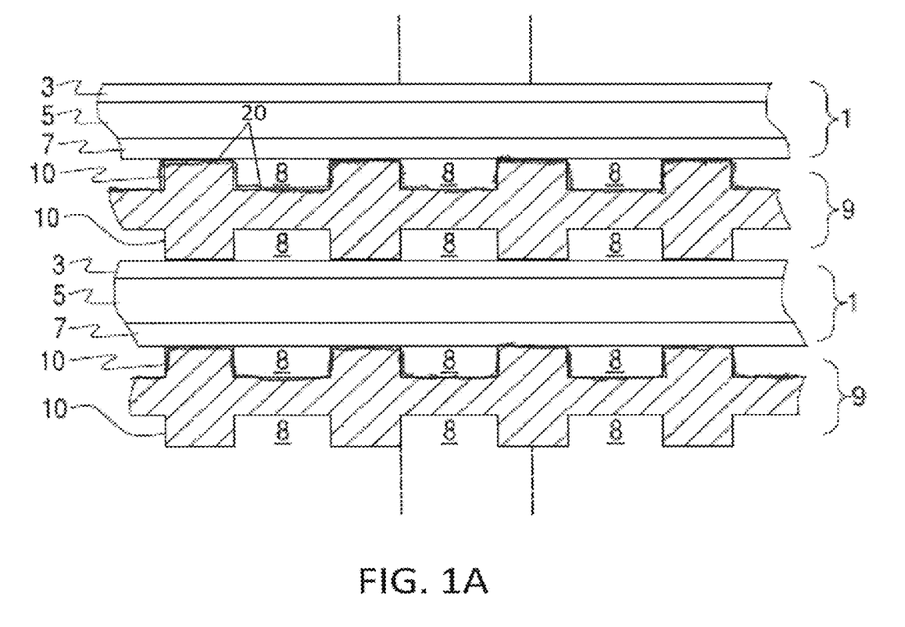
FIG. 1A illustrates a side cross-sectional view of a SOFC stack.

FIG. 1A illustrates a SOFC stack in which each SOFC 1 comprises a cathode electrode 7, a solid oxide electrolyte 5, and an anode electrode 3. Fuel cell stacks are frequently built from a multiplicity of SOFC's 1 in the form of planar elements, tubes, or other geometries. Fuel and air has to be provided to the electrochemically active surface, which can be large.

The gas flow separator 9 (referred to as a gas flow separator plate when part of a planar stack), containing gas flow passages or channels 8 between ribs 10, separates the individual cells in the stack. The ribs 10 on opposite sides of the plate may be offset from each other, as described in U.S. Published Patent Application Number 2008/0199738 A1 (filed on Feb. 16, 2007 as U.S. application Ser. No. 11/707, 070) which is incorporated herein by reference in its entirety. The gas flow separator plate separates fuel, such as a hydrocarbon fuel, flowing to the fuel electrode (i.e. anode 3) of one cell in the stack from oxidant, such as air, flowing to the air electrode (i.e. cathode 7) of an adjacent cell in the stack. At either end of the stack, there may be an air end plate or fuel end plate (not shown) for providing air or fuel, respectively, to the end electrode.

Frequently, the gas flow separator plate 9 is also used as an interconnect which electrically connects the anode or fuel electrode 3 of one cell to the cathode or air electrode 7 of the adjacent cell. In this case, the gas flow separator plate which functions as an interconnect is made of or contains electrically conductive material. FIG. 1 shows that the lower SOFC 1 is located between two interconnects 9.

Figure 1B:
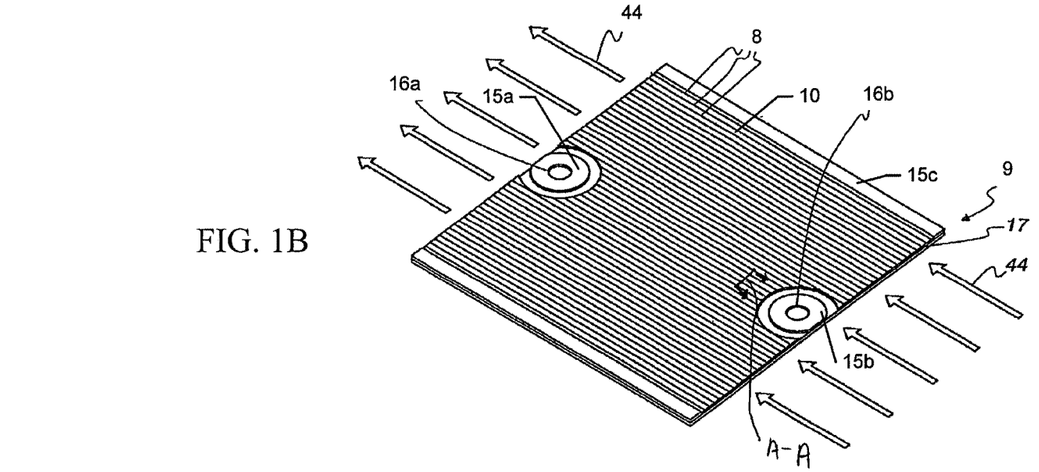
FIGS. 1B and 1C show, respectively, top and bottom views of an interconnect for a SOFC stack.
Figure 1C:
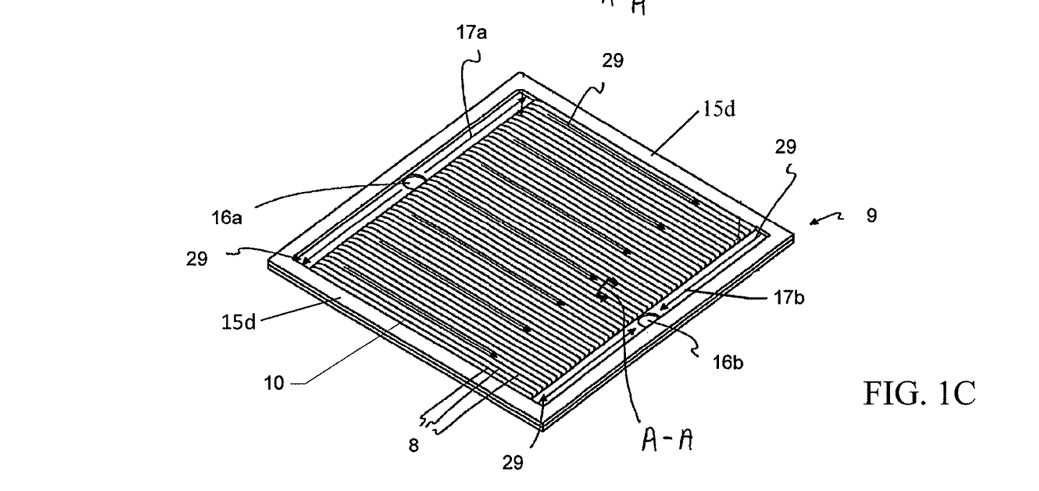

FIGS. 1B and 1C show, respectively, top and bottom views of an interconnect 9. The portions of interconnect 9 shown in side cross-section in FIG. 1A are provided along lines A-A in FIGS. 1B and 1C. The interconnect 9 contains gas flow passages or channels 8 between ribs 10. The interconnect 9 in this embodiment includes at least one riser channel 16a for providing fuel to the anode-side of the SOFC 1, as illustrated by arrow 29. The riser channel 16a generally comprises a fuel inlet riser opening or hole that extends through at least one layer of the fuel cells and interconnects in the stack. As illustrated in FIG. 1C, the fuel can flow through the inlet riser channel 16a to the anode-side of each fuel cell. There, the fuel can collect in an inlet plenum 17a (e.g., a groove in the interconnect's surface), then flow over the fuel cell anode 3 through gas flow channels 8 formed in the interconnect 9 to an outlet plenum 17b and then exit through a separate outlet riser channel 16b.

The cathode side, illustrated in FIG. 1B, can include gas flow passages or channels 8 between ribs 10 which direct air flow 44 over the cathode electrode of the fuel cell. Seals 15a, 15b can seal the respective risers 16a, 16b on the cathode-sides of the interconnect and fuel cell to prevent fuel from reaching the cathode electrode of the fuel cell. The seals may have a donut or hollow cylinder shape as shown so that the risers 16a, 16b extend through the hollow middle part of the respective seals 15a, 15b. The seals 15a, 15b can include an elevated top surface for contacting against the flat surface of the adjacent SOFC 1. Strip seals 15c may be provided along two opposing edges of the interconnect. A peripheral (i.e., window) seal 15d can seal the anode-side of the interconnect and fuel cell to prevent air from reaching the anode electrode of the fuel cell, as shown in FIG. 1C.

For solid oxide fuel cell stacks, the interconnect 9 is typically made from an electrically conductive metal material, and may comprise a chromium alloy, such as a Cr—Fe alloy made by a powder metallurgy technique. The powder metallurgy technique may include pressing and sintering a mixture of Cr and Fe powders to form a Cr—Fe alloy interconnect in a desired size and shape (e.g., a "net shape" or "near net shape" process). A typical chromium-alloy interconnect may comprise at least about 80% chromium, and preferably more than about 90% chromium, such as about 94-96% (e.g., 95%) chromium by weight. The interconnect may contain less than about 20% iron, and preferably less than about 10% iron, such as about 4-6% (e.g., 5%) iron by weight. The interconnect may contain less than about 2%, such as about zero to 1% of other materials, such as yttrium or yttria, as well as residual or unavoidable impurities.

In a conventional method for fabricating interconnects, blended Cr and Fe elemental powders are pressed in a hydraulic or mechanical press to produce a part having the desired interconnect shape. The Cr and Fe powders are blended with an organic binder and pressed into so-called "green parts" using a conventional powder metallurgy technique. The "green parts" have substantially the same size and shape as the finished interconnect (i.e., "near net shape"). The organic binder in the green parts is removed before the parts are sintered. The organic binder is removed in a debinding process in a furnace that is operated at atmospheric pressure at a temperature of 400° C. to 800° C. After debinding, the compressed powder Cr—Fe interconnects are sintered at high-temperature (e.g., 900-1550° C.) to promote interdiffusion of the Cr and Fe. The interconnects may undergo a separate controlled oxidation treatment, such as by exposing the interconnects to an oxidizing ambient, such as air at high temperature after sintering, prior to use of the interconnects in the stack.

The surface of the interconnect 9 that in operation is exposed to an oxidizing environment (e.g., air), such as the cathode-facing side of the interconnect, may be coated with a protective coating layer (20 in FIG. 1A) in order to decrease the growth rate of a chromium oxide surface layer on the interconnect and to suppress evaporation of chromium vapor species which can poison the fuel cell cathode. Typically, the coating layer, which can comprise a perovskite such as lanthanum strontium manganite (LSM), may be formed using a spray coating or dip coating process. Alternatively, other metal oxide coatings, such as a spinel, such as a $(Mn, Co)_3O_4$ spinel, can be used instead of or in addition to LSM. Any spinel having the composition $Mn_{2-x}Co_{1+x}O_4$ ($0 \leq x \leq 1$) or written as $z(Mn_3O_4)+(1-z)(Co_3O_4)$, where ($\frac{1}{3} \leq z \leq \frac{2}{3}$) or written as $(Mn, Co)_3O_4$ may be used. The protective coating layer 20 is typically formed on the surface of the interconnect 9 after the sintering and controlled oxidation steps described above. The surface of the interconnect 9 must typically be pre-treated to remove surface oxides (e.g., via a grit blasting process) before the protective layer 20 is applied.

Figure 2A:
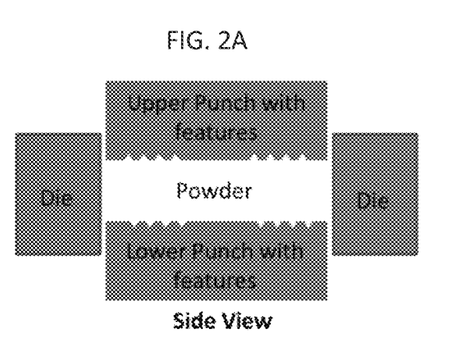
FIGS. 2A and 2B are respective side cross sectional and top views of a powder metallurgy (PM) apparatus for making interconnects for a fuel cell stack.
Figure 2B:
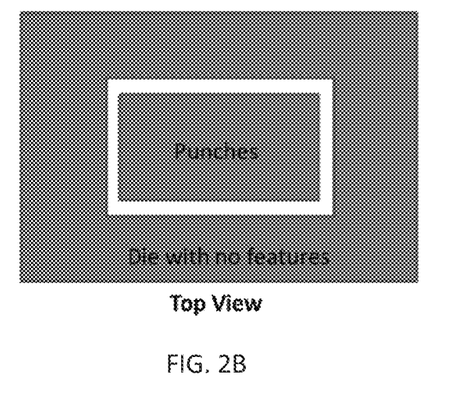
Figure 3A:
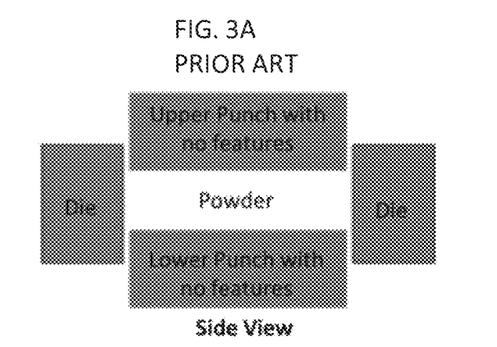
FIGS. 3A and 3B are respective side cross sectional and top views of a prior art PM apparatus.
Figure 3B:
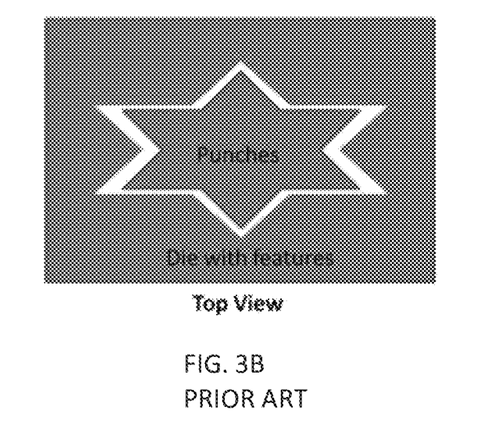

Powder metallurgy (PM) technology creates the shape of a part using three components in a compaction press—the upper punch, the lower punch and a die. The design of the interconnect necessitates various cross sectional thickness to be molded by features on the punches, i.e., there is cross sectional thickness variation in the direction of compaction tonnage (FIGS. 2A and 2B). This is different from most parts that are processed using PM technology where the punches are typically flat and the die is the component that contains the geometric features, i.e., the cross sectional thickness in the direction of compaction tonnage is uniform (FIGS. 3A and 3B).

Fabrication of interconnects using the above-described powder metallurgy technique may be very expensive and time consuming due, in part, to the large number of process steps involved and the very high temperature sintering required to produce the final Cr—Fe alloy interconnect having the desired mechanical and thermal characteristics. There is a need for further improvement in the fabrication of interconnects for fuel cell systems.

Various embodiments include improved methods of fabricating interconnects for a fuel cell stack, including Cr—Fe-based metal alloy interconnects used in a solid oxide fuel cell (SOFC) stack. In one embodiment, a protective coating layer (e.g., a metal oxide material coating, such as a manganese cobalt oxide (MCO) and/or a perovskite, such as LSM) is formed on a surface of the interconnect without first sintering the interconnect. In embodiments, the protective coating layer may be provided on a surface of the pressed powder interconnect (i.e., on the "green part"). The protective coating layer may be provided on the surface of the pressed powder interconnect following an optional de-binding step to remove organic binder material (if present) from the green part. The protective coating layer may be provided over an "unsintered" interconnect, meaning the interconnect has not previously been subjected to a separate sintering step. In some embodiments, the interconnect with the protective coating may be annealed at elevated temperature to bond the protective coating to the pressed powder interconnect. The annealing may be performed at a relatively low temperature (e.g., at a peak temperature of 950-1000° C.), which may be lower than the temperatures typically used for sintering Cr—Fe-based interconnects formed by powder metallurgy. The annealing step may be performed in a reducing environment, such as in a hydrogen and inert gas environment (e.g., a hydrogen 10%/argon environment), in an oxygen-containing environment (e.g., air) or in an inert gas environment.

In embodiments, the pressed powder interconnect may be formed from a powder stock comprising pre-alloyed particles comprising two or more metal elements (e.g., Cr and Fe). In some embodiments, the pre-alloyed particles may be comprised of a plurality of individual particles having a mean and/or median dimensional size (e.g., diameter) that is less than about 30 µm (e.g., 5-30 µm, such as about 10-20 µm) which are agglomerated to form agglomerated particle clusters having a mean and/or median dimensional size (e.g., diameter) that is between about 110-160 µm (e.g., 130-140 µm). In some embodiments, the pre-alloyed particles may comprise individual (i.e., non-agglomerated) pre-alloyed particles comprising two or more metal elements (e.g., Cr and Fe) and having a mean and/or median dimensional size (e.g., diameter) that is between about 110-160 µm (e.g., 130-140 µm). In embodiments, the pressed powder interconnect may be formed using high velocity compaction.

In embodiments, the pressed powder interconnect with a protective coating layer may be placed into a fuel cell stack, such as a solid oxide fuel cell stack. The interconnect may be placed into the stack without first undergoing a separate controlled oxidation step. In embodiments, the interconnect may be placed into the stack such that a seal material (e.g., a glass or glass-ceramic seal material) is located between the interconnect and the adjacent fuel cells in the stack. The fuel cell stack, including the interconnects, fuel cells and seal material, may be annealed at elevated temperature (e.g., 600-1000° C.) in an oxidizing environment (e.g., air or air/inert gas), which may cause oxides to form and fill in pores of the interconnect and reduce the porosity of the interconnect. The interconnects may be annealed during a stack "sintering" process for heating, melting and/or reflowing glass or glass-ceramic seal precursor materials to form seals in the fuel cell stack.

Thus, in summary, various embodiments enable fabrication of interconnects while eliminating a separate high-temperature interconnect sintering step before a protective layer is applied to the surface of the interconnect. Instead, the protective layer may be applied to an unsintered interconnect, and the interconnect and protective layer may be annealed at a relatively lower temperature (e.g., 900-1000° C., such as 950-1000° C.). Various embodiments may also enable the elimination of separate pre-oxidation and surface oxide removal steps before the protective layer is applied to the interconnect. Further, an oxidation pre-treatment to fill pores of the interconnect and increase the gas impermeability of the interconnect may be performed after the interconnect is placed in the fuel cell stack and in conjunction with the sealing of the stack (i.e., "stack sintering"). Preferably, but not necessarily, the interconnect with a protective layer is both annealed and oxidized after the coated interconnect is placed into the fuel cell stack.

Figure 4:
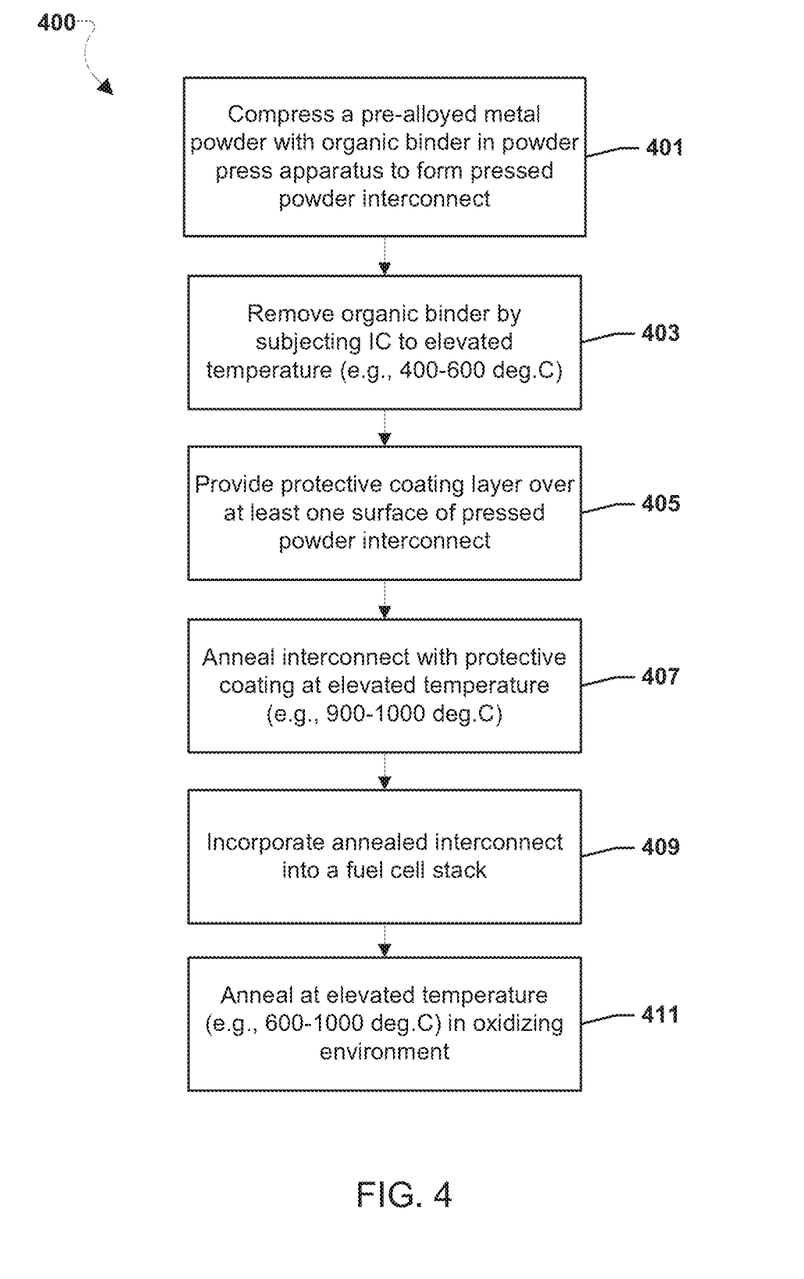
FIG. 4 is a flow diagram illustrating a method for fabricating an interconnect for a fuel cell stack according to an embodiment.

An embodiment method 400 for fabricating an interconnect for a fuel cell stack is illustrated in FIG. 4. In block 401 of the method, a pre-alloyed metal powder which may be mixed with an organic binder (e.g., lubricant) is compressed in a powder press apparatus to form a pressed powder interconnect (i.e., a "green part") having substantially the same size and shape as the finished interconnect (i.e., "near net shape"). The pre-alloyed metal powder may comprise metal alloy particles containing chromium and iron (e.g., ≥80 wt % Cr and ≤20 wt % Fe, such as ≥90 wt % Cr and ≤10 wt % Fe, including ~94-96 wt % Cr and ~4-6 wt % Fe) and may also include less than 2 wt % (e.g., 0-1 wt %) of other elements or unavoidable impurities, such as silicon, aluminum, yttrium or yttria.

The pre-alloyed metal powders may optionally be mixed with other metal powders (e.g., elemental Cr and/or Fe powders) to provide a powder mixture that will result in a desired coefficient of thermal expansion (CTE) in the final interconnect. In general, the CTE of the interconnect may be matched to one or more other components of a fuel cell stack, such as the fuel cell electrolyte material in an electrolyte-supported fuel cell system. In various embodiments, the average CTE of the interconnect may be within about 10%, such as within 5% of the CTE of an electrolyte material for the fuel cell, including within about 1% of the CTE of the fuel cell electrolyte. The fuel cell may be a solid oxide fuel cell having a ceramic electrolyte material, which may be a stabilized zirconia, such as scandia stabilized zirconia (SSZ) and/or yttria stabilized zirconia (YSZ). The CTE of the interconnect may be between about $7 \times 10^{-6}/°$ C. and $13 \times 10^{-6}/°$ C., such as $8.5$-$10.5 \times 10^{-6}/°$ C., including $9$-$10 \times 10^{-6}/°$ C. (e.g., $9.53$-$9.71 \times 10^{-6}/°$ C.), such as $9.57$-$9.67 \times 10^{-6}/°$ C.), and preferably about $9.62 \times 10^{-6}/°$ C., to match the $9.62 \times 10^{-6}/°$ C. CTE of SSZ. Alternatively, the CTE of the interconnect may be between about $9.5$-$11.5 \times 10^{-6}/°$ C., such as $10$-$11 \times 10^{-6}/°$ C. (e.g., $10.4$-$10.6 \times 10^{-6}/°$ C.), and preferably about $10.5 \times 10^{-6}/°$ C., to match the $10.5 \times 10^{-6}/°$ C. CTE of YSZ. Alternatively, the CTE of the interconnect may be matched to the CTE of another ionically conductive electrolyte material, such as a doped ceria. For anode supported cells, the CTE of the interconnect may be matched to the anode CTE.

The pre-alloyed metal powders may have at least one of a mean and a median dimensional size (e.g., diameter) that is between about 110-160 μm (e.g., 130-140 μm) (e.g., individual metal powder particle size or agglomerated particle cluster size). Smaller powders (e.g., powders having a mean or median dimensional size <100 μm) may not be suitable due to their flow properties. In embodiments, the pre-alloyed metal powders loaded into the die cavity of the powder metallurgy apparatus may have a flow rate of ≤30 sec/50 g (e.g., 10-30 sec/50 g) as measured by a Hall flow meter. The pre-alloyed powders may comprise individual particles with a mean and/or median dimensional size (e.g., diameter) between about 110-160 μm and/or smaller particles that are agglomerated to form agglomerated particle clusters having a mean and/or median dimensional size (e.g., diameter) between about 110-160 μm, as discussed further below.

In embodiments, the pre-alloyed powder may be loaded into a die cavity and compressed using a powder metallurgy apparatus (i.e., powder press) as illustrated in FIGS. 2A-B. In some embodiments, the pre-alloyed powder may be compressed using a high velocity compaction process, as described in commonly-owned U.S. Patent Application Publication No. 2013/0129557, the entire contents of which are incorporated herein by reference. A conventional compaction apparatus may reach a compacting speed at impact of between about 0.02 m/sec. and 0.1 m/sec. High velocity compaction is characterized by compacting speeds at impact that are greater than 0.1 m/sec, such as greater than about 1.0 m/sec, and may be in a range between about 1.0 m/sec and 100 m/sec. Generally, a high velocity compaction process is sufficient to provide a single-press, net shape or near net shape interconnect according to various embodiments. In embodiments, the high velocity compaction may provide at least about 40% of the total compaction of the interconnect in 100 msec or less (e.g., 50 msec). It will be understood that certain high velocity compaction methods, such as explosive compaction, may reach a compacting speed sufficient to cause the particle interfaces melt due to frictional heating, and could be used in various embodiments.

In some embodiments, such as when the pre-alloyed metal powders are compressed using high velocity compaction, the pre-alloyed metal powders may be compressed without any organic binder (i.e., lubricant) being present in the die cavity.

In various embodiments, the pressed powder interconnect may have a density of 6.6 g/cm$^3$ or more (e.g., 7-7.5 g/cm$^3$) following compaction at 400-800 MPa. If present, the organic binder (i.e., lubricant) may be removed from the pressed green part by "debinding" the interconnect at elevated temperature (e.g., 400-600° C., such as ~500° C.), as shown in block 403 of FIG. 4. The debinding step may be performed at atmospheric pressure in air.

In block 405 of method 400, a protective coating layer may be provided over at least one surface of the pressed, debindered powder interconnect. The protective coating layer may comprise a manganese cobalt oxide (MCO) material, such as an (Mn, Co)$_3$O$_4$ spinel. Alternatively or in addition, the protective coating layer may comprise another metal oxide material, such as a spinel or a perovskite, including lanthanum strontium manganite (LSM). The protective coating layer may be provided over one or more surfaces of the interconnect which in operation are exposed to an oxidizing environment (e.g., air), including the cathode-facing surface of the interconnect. The protective coating layer may be applied using any suitable technique, such as spray coating or dip coating.

In an alternative embodiment, the coating material may be provided in the die cavity of the powder press apparatus (e.g., in a powder form) over at least one surface of the pre-alloyed metal powder mixture, and compacted with the pre-allowed metal powder mixture (e.g., using high velocity compaction) to form an interconnect having a protective coating layer over at least one surface of the interconnect, as is described in U.S. Patent Application Publication No. 2013/0129557 which is incorporated herein by reference. In this alternative embodiment, the separate step 305 of providing a protective coating layer to the pressed powder interconnect (e.g., via spray coating or dip coating) may be omitted from method 300. Further, in some embodiments, the metal powder in the die cavity may not be mixed with an organic binder prior to high velocity compaction, and in these cases the debinding step (block 403) of FIG. 4 may be omitted.

In block 407 of method 400, the pressed powder interconnect with a protective coating layer over at least one surface of the interconnect may be annealed at elevated temperature. The annealing may be performed at a peak temperature of 900-1000° C., such as 950-1000° C., and may be performed in a reducing environment, such as a hydrogen-inert gas environment (e.g., a hydrogen 5-25%/argon 75-95%, such as hydrogen 10%/argon 90% environment). Alternately, the annealing may be performed in an oxygen-containing environment (e.g., air) or in an inert gas environment (e.g., argon). The annealing may be performed under conditions sufficient to bond the protective coating layer to the interconnect. The annealing step may also at least partially sinter the interconnect.

The peak annealing temperature of 900-1000° C. (e.g., 950-1000° C.) in this embodiment may be relatively lower than in conventional processes for sintering of Cr—Fe based interconnects, which typically have peak sintering temperatures greater than 1100°, such as 1100-1520°. However, the lower temperature of the annealing helps to maintain the tight dimensional tolerances of the interconnect and the protective coating layer (e.g., there may be <1% shrinkage during annealing) and provides sufficient interdiffusion of Cr and Fe in an interconnect formed from pre-alloyed powders (i.e., the degree of Cr—Fe interdiffusion required during sintering with pre-alloyed Cr—Fe powders is not as great as is required with conventional Cr and Fe elemental powders). The annealed interconnect may also be relatively gas impermeable. Some open porosity may remain, but an objective in various embodiments is to provide an interconnect that is mechanically stable and can be handled in stack manufacturing process without damaging the part or changing its dimensions.

In block 409 of method 400, the interconnect is incorporated into a fuel cell stack. The interconnect 9 may be placed into the fuel cell stack between two fuel cells 1 as shown in FIG. 1A. A seal material, such as a glass or glass-ceramic precursor material, may be located between the interconnect 9 and the surfaces of the adjacent fuel cells 1. On the anode (i.e., fuel) side of the interconnect 9, the seal material may be provided as a window seal 15d, as shown in FIG. 1C. On the cathode (i.e., air) side of the interconnect 9, the seal material may be provided as hollow cylindrical (i.e., "donut") seals 15a, 15b surrounding the fuel riser channel openings 16a, 16b and strip seals 15c extending along two opposing edges of the interconnect 9, as shown in FIG. 1B.

In block 411 of method 400, the interconnect which has been incorporated into a fuel cell stack may be annealed at elevated temperature (e.g., 600-1000° C.) in an oxidizing environment (e.g., air). The annealing may cause oxides to form on the interconnect, including within the pores of the interconnect, causing the pores to fill and further reducing the porosity and thus the gas permeability of the interconnect. The pores of the interconnect may be relatively small, and therefore relatively easier to fill to render the interconnect substantially gas impermeable, when fine powders (e.g., having mean and/or median size of 30 µm or less, such as 10-20 µm) are used to form the powder pressed interconnect. The fine powders may be agglomerated to form larger particle clusters (e.g., 110-160 µm) to improve flow characteristics when the particles are loaded into the powder press die cavity.

During the oxidizing anneal, the interconnect may be sufficiently oxidized (i.e., pre-oxidized) such that the interconnect will not unduly expand and contract due to oxidation during stack power generation operation.

The annealing of the interconnect may be performed in conjunction with the formation of seals within the fuel cell stack. As described in commonly-owned U.S. Published Patent Application No. 2013/0216927, which is incorporated by reference herein, "sintering" includes processes for heating, melting and/or reflowing glass or glass-ceramic seal precursor materials to form seals in a fuel cell stack, which may be performed at elevated temperature (e.g., 600-1000° C.) in air and/or inert gas. "Conditioning" includes processes for reducing a metal oxide (e.g., nickel oxide) in an anode electrode to a metal (e.g., nickel) in a cermet electrode (e.g., nickel and a ceramic material, such as a stabilized zirconia or doped ceria) and/or heating the stack during performance characterization/testing, and may be performed at elevated temperature (e.g., 750-900° C.) while fuel flows through the stack. The sintering and conditioning of the fuel cell stack may be performed during the same thermal cycle (i.e., without cooling the stack to room temperature between sintering and conditioning). Thus, rather than performing a separate pre-oxidation step prior to incorporating the interconnects into the stack, the interconnects may be oxidized during the stack "sintering" process used to form (e.g., flow and set) the seals, and may be performed during the same thermal cycle as the "conditioning" process as described above.

In some embodiments, both the annealing step for bonding the protective layer to the pressed-powder interconnect (i.e., block 407 of FIG. 4) and the oxidizing anneal (i.e., block 411 of FIG. 4) may be performed after the interconnect is incorporated in the fuel cell stack (i.e., block 409 of FIG. 4), and both of these steps may optionally be performed at the same time and/or during the same thermal cycle.

Figure 5:
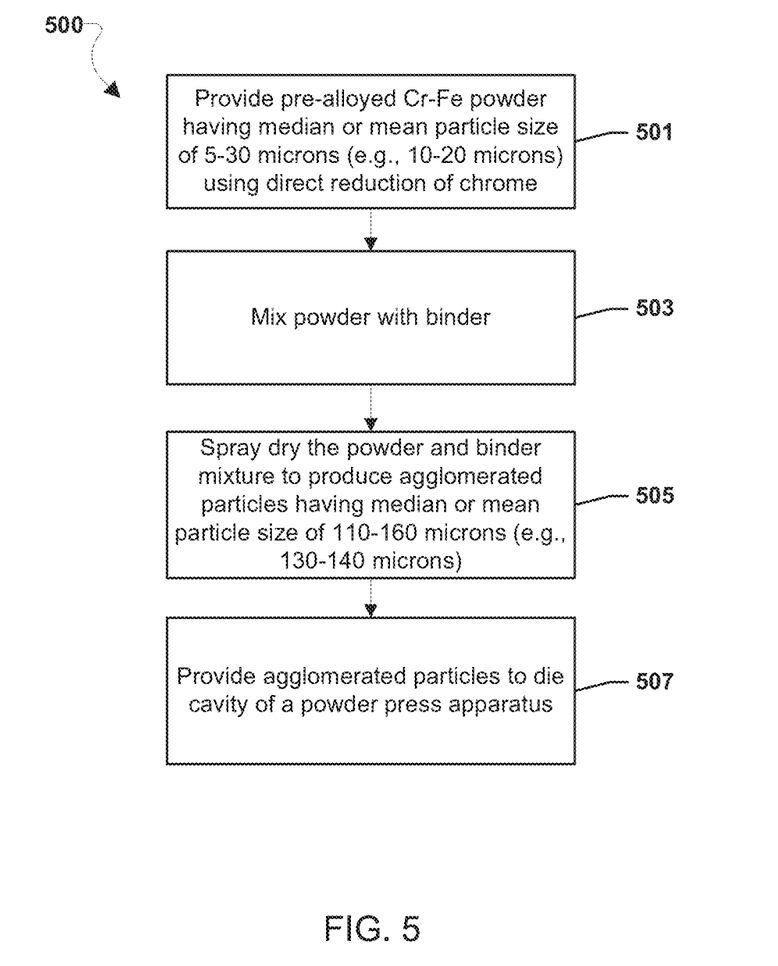
FIG. 5 is a flow diagram illustrating a method for forming a pre-alloyed powder according to an embodiment.

FIG. 5 is a flow diagram illustrating an embodiment method 500 for forming a pre-alloyed metal powder stock for use in fabricating an interconnect by powder metallurgy. In block 501 of method 500, a pre-alloyed Cr—Fe powder having a mean and/or median dimensional size (e.g., diameter) that is less than about 30 µm (e.g., 5-30 µm, such as about 10-20 µm) may be provided. In one embodiment, the pre-alloyed Cr—Fe powder may be formed using a direct reduction technique using chrome ore ($Fe_xCr_yO_z$). This process may be used to provide a pre-alloyed powder containing Cr, Fe and optionally other metallic or non-metallic materials (e.g., Si, Al, etc.). The electrical conductivity of the interconnect is typically not a limiting factor, so some metallic and non-metallic impurities may be tolerated. The chrome ore may be further processed to provide a suitable raw material due to the relatively low chromium content of the ore (e.g., typically 45-60 wt % Cr), or chrome ores with particularly high Cr content may be utilized. In embodiments, the chrome ore powder may be mixed in a suitable ratio with other similarly-sized powders (e.g., elemental Cr powders) to provide a powder stock having the desired Cr content (e.g., ≥90 wt % Cr, such as 94-96 wt % Cr).

In block 503 of method 500, the pre-alloyed powder may be mixed with a suitable binder material, and in block 505, the powder and binder mixture may be spray dried to produce agglomerated particle clusters having a mean and/or median dimensional size (e.g., diameter) of 110-160 µm (e.g., 130-140 µm). The agglomerated particle clusters may be provided to a die cavity of a powder press apparatus in block 507. The agglomerated pre-alloyed powder particle clusters may be used to fabricate an interconnect using the method 400 illustrated in FIG. 4. For example, the interconnect may be fabricated by powder metallurgy using a conventional powder press apparatus, as shown in FIGS. 2A-B. In some embodiments, the interconnect may be formed using high velocity compaction, as described above. Following compaction, the pressed powder interconnect may be debinded, a protective coating layer (e.g., MCO, LSM, etc.) may be provided over at least one surface of the interconnect without first sintering or pre-oxidizing the interconnect, the interconnect and protective coating may be co-sintered at 900-1000° C. (e.g., 950-1000° C.) in a reducing ambient, e.g., a hydrogen containing ambient, and the sintered interconnect may be incorporated into a fuel cell stack. The interconnect may be oxidized in the stack, such as during the stack "sintering" process as described above.

Given that the powder used for form the agglomerated particle clusters is so fine (e.g., 5-30 µm, such as about 10-20 µm), there will generally be sufficient bonding of the particles during the relatively low temperature sintering, and since the powder is pre-alloyed it may achieve the CTE target and uniformity. The porosity of the sintered interconnect will typically be very fine, and during stack sintering the oxidation will fill the pores and render the interconnect sufficiently gas impermeable.

Figure 6:
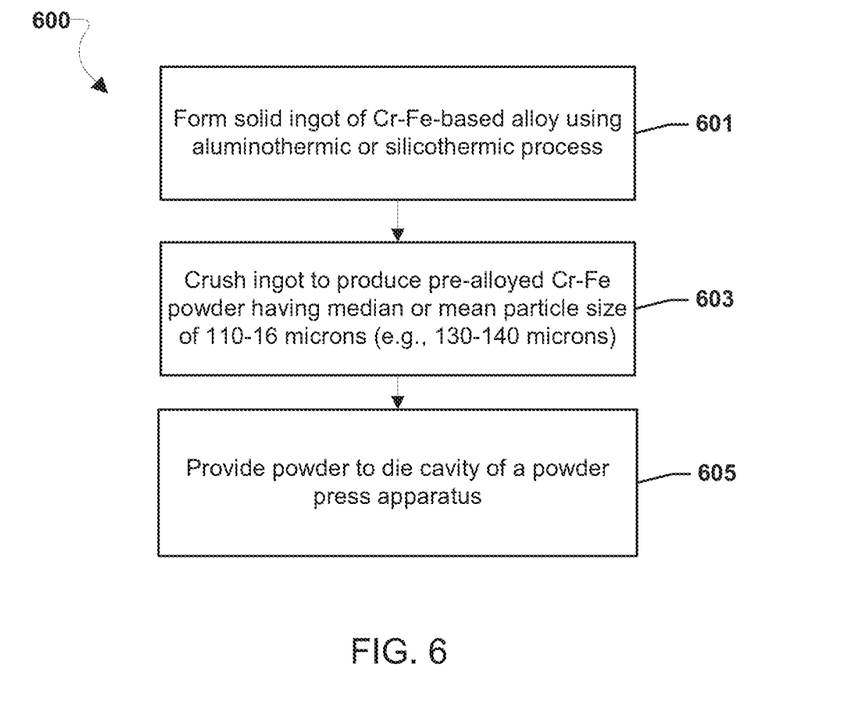
FIG. 6 is a flow diagram illustrating a method for forming a pre-alloyed powder according to another embodiment.

FIG. 6 is a flow diagram illustrating an alternative method 600 for forming a pre-alloyed metal powder stock for use in fabricating an interconnect by powder metallurgy. In block 601 of method 600, a solid ingot of a Cr—Fe based alloy (e.g., Cr94-96-Fe4-6%, such as Cr95%-Fe5%) is formed. In embodiments, the Cr—Fe based alloy may be formed using an aluminothermic process in which iron oxide is added to chromium oxide and the mixture is reduced in a conventional aluminothermic process as is currently used for making Cr metal. In an alternative embodiment, the Cr—Fe based alloy may be formed using a silicothermic process using chrome ore to obtain the Cr—Fe based alloy.

In block 603 of method 600, the solid ingot of Cr—Fe based alloy may be crushed or pulverized to form a pre-alloyed powder using any suitable powdering process. The pre-alloyed powder may have at least one of a median and a mean dimensional size (e.g., diameter) of 110-160 µm (e.g., 130-140 µm). In block 605, the powder may be provided to the die cavity of a powder press apparatus, and may be used to fabricate an interconnect using the method 400 illustrated in FIG. 4. For example, the interconnect may be fabricated by powder metallurgy using a conventional powder press apparatus, as shown in FIGS. 2A-B. In some embodiments, the interconnect may be formed using high velocity compaction, as described above. Particles formed via the method 600 of FIG. 6 may be particularly suitable for high velocity compaction because pre-alloyed Cr—Fe particles containing for example 4-6 wt % Fe may be less compressible than mixture of Cr and Fe elemental particles or agglomerated particle clusters formed from smaller Cr—Fe prealloyed powders.

Following compaction, the pressed powder interconnect may be debinded (if compacted using an organic binder), a protective coating layer (e.g., MCO, LSM, etc.) may be provided over at least one surface of the interconnect without first sintering or pre-oxidizing the interconnect, the interconnect and protective coating may be co-sintered at 900-1000° C. (e.g., 950-1000° C.) in a reducing ambient, e.g., a hydrogen containing ambient, and the sintered interconnect may be incorporated into a fuel cell stack. The interconnect may be oxidized in the stack, such as during the stack "sintering" process as described above.

In addition to pre-alloyed metal powders formed using the methods of FIGS. 5-6, pre-alloyed metal powders useable for interconnect fabrication may be produced using any other suitable technique. For example, all or a portion of the pre-alloyed metal powders may comprise "pre-sintered" powders as disclosed in U.S. Patent Application Publication No. 2013/0129557, which was previously incorporated by reference. As described in U.S. 2013/0129557, a "pre-sintered" powder includes combined or agglomerated particles (e.g., Cr and Fe particles) that are subjected to an elevated temperature in a reducing ambient to produce at least some interdiffusion of the constituent materials, although the materials need not be perfectly mixed at the atomic level, such as in alloyed materials.

Optionally, in an alternative embodiment, all or a portion of the powder stock may be obtained by crushing previously-fabricated (i.e., recycled) interconnects. The crushed recycled interconnects may be annealed at elevated temperature in a reducing (e.g., hydrogen-containing) environment to reduce the oxide content of the powder.

In another alternative embodiment, rather than crushing the ingot in step 603 into a powder having at least one of a median and a mean dimensional size (e.g., diameter) of 110-160 µm (e.g., 130-140 µm), the ingot is crushed into a powder having a smaller size. The smaller size powder is then agglomerated into particle clusters having at least one of a median and a mean dimensional size (e.g., diameter) of 110-160 µm (e.g., 130-140 µm).

In another alternative embodiment, rather than forming an ingot in step 601 and crushing the ingot into a powder in step 603, the powder may be formed directly without first forming an ingot using any suitable powder forming method.

In another embodiments, a metal powder may be compressed using the high velocity compaction described above such that no separate sintering step is needed before the pressed powder interconnect is incorporated into a fuel cell stack.

The metal powder may include chromium (e.g., ≥90 wt % Cr) and iron (e.g. ≤10 wt % Fe), such as ~94-96 wt % Cr and ~4-6 wt % Fe, and less than 2 wt % (e.g., 0-1 wt %) of other elements or unavoidable impurities, such as silicon, aluminum, yttrium or yttria. The metal powder may include pre-alloyed powders (e.g., pre-alloyed Cr—Fe particles, as described above), elemental metal powders (e.g., a mixture of elemental Cr powders and elemental Fe powders), or both pre-alloyed powders and elemental powders.

The powder is then compacted using the high velocity compaction described above to form the pressed powder interconnect. The protective layer described above (e.g., manganese cobalt oxide and/or LSM) may then be optionally formed over the air side of the pressed powder interconnect.

The pressed powder interconnect (without or without the protective layer) is then provided into the fuel cell stack as described above without performing the above described sintering step before the pressed powder interconnect is incorporated into a fuel cell stack. The pressed powder interconnect may optionally be oxidized before or after being incorporated into the stack. Furthermore, the pressed powder interconnect may optionally be sintered as described above after being incorporated into the fuel cell stack.

Figure 7:
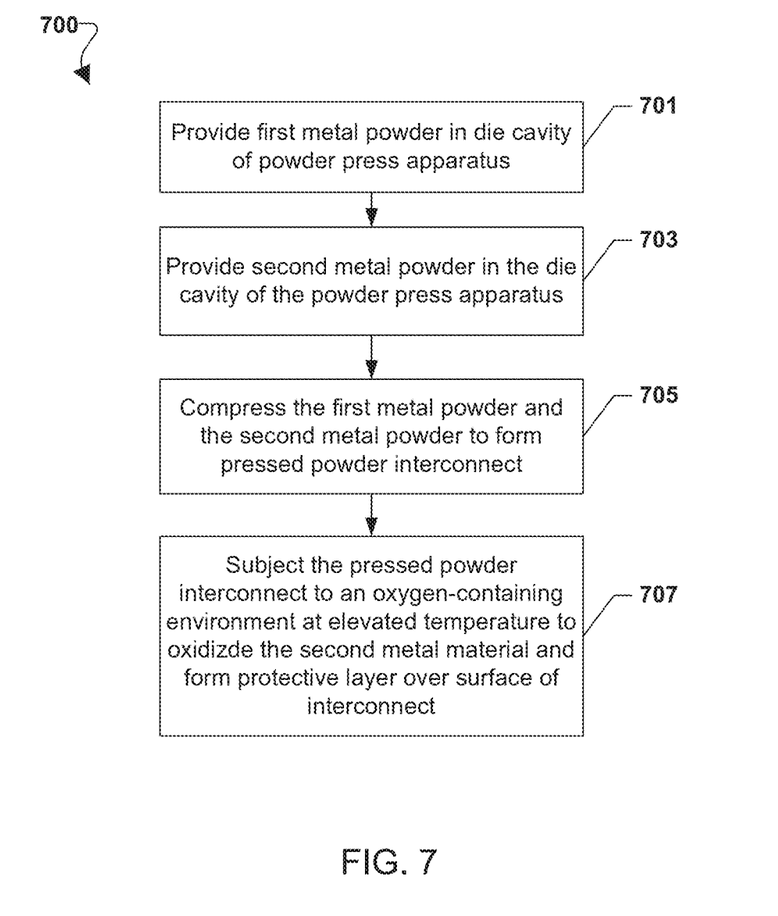
FIG. 7 is a flow diagram illustrating a method for fabricating an interconnect for a fuel cell stack according to another embodiment.

Another embodiment method 700 for fabricating an interconnect for a fuel cell stack is illustrated in the flow diagram of FIG. 7. In this method, two metal powders comprised of different metal materials are compressed in a powder press apparatus to form a pressed powder interconnect, and one of the metal materials is oxidized to form a metal oxide protective layer over a surface of the interconnect. In block 701 of FIG. 7, a first metal powder may be provided in a die cavity of a powder press apparatus, such as shown in FIGS. 2A and 2B. The first metal powder comprises a first metal material, which may include chromium (e.g., ≥90 wt % Cr) and iron (e.g. ≤10 wt % Fe), such as ~94-96 wt % Cr and ~4-6 wt % Fe, and less than 2 wt % (e.g., 0-1 wt %) of other elements or unavoidable impurities, such as silicon, aluminum, yttrium or yttria. The first metal powder may include pre-alloyed powders (e.g., pre-alloyed Cr—Fe particles, as described above), elemental metal powders (e.g., a mixture of elemental Cr powders and elemental Fe powders), or both pre-alloyed powders and elemental powders.

In block 703, a second metal powder may be provided in the die cavity of the powder press apparatus. The second metal powder may be provided over the first metal powder in the die cavity (i.e., the first metal powder may be loaded into the die cavity first, followed by the second metal powder). Alternately, the order may be reversed such that the second metal powder is initially provided in the die cavity and the first metal powder is provided over the second metal powder. The second metal powder comprises a second metal material that is different than the first metal material (i.e., the composition of the second metal material is different than the composition of the first metal material). In various embodiments, the second metal material may comprise manganese and cobalt. It will be understood that the second metal material may comprise any metal material(s) (e.g., metal or metal alloy) that may be oxidized to form a protective layer over a surface of the interconnect. The second metal powder may include pre-alloyed powders (e.g., pre-alloyed Mn—Co particles), elemental metal powders (e.g., a mixture of elemental Mn powders and elemental Co powders), or both pre-alloyed powders and elemental powders.

In block 705, the first metal powder and the second metal powder are compressed in the powder press apparatus to form a pressed powder interconnect. A layer of the second metal material may be located over the first metal material in the pressed powder interconnect, and may form an outer surface of the interconnect. The powders may be compressed (e.g., compacted) using any suitable powder metallurgy technique to form the pressed powder interconnect. The powders may be compressed with or without an organic binder (i.e., lubricant), and may optionally be compressed using high velocity compaction as described above. The compressing step may optionally be followed by a debindering step and/or a sintering step, such as described above with reference to FIG. 4.

In some embodiments, the first metal powder and the second metal powder may be compressed using high velocity compaction such that no separate sintering step is needed before the pressed powder interconnect is incorporated into a fuel cell stack.

In block 707, the pressed powder interconnect may be subjected to an oxygen-containing environment at elevated temperature (e.g., greater than 100° C., such as 600-1000° C.) to oxidize the second metal material and form a protective layer over a surface of the interconnect. For example, where the second metal material includes manganese and cobalt, the second metal material may be oxidized to form a protective layer comprising manganese cobalt oxide (MCO) material, such as an (Mn, Co)$_3$O$_4$ spinel. In some embodiments, the pressed powder interconnect may be placed into the fuel cell stack between two fuel cells and the oxidation may be performed in the fuel cell stack (e.g., as part of a stack annealing process), as described above with reference to FIG. 4. In other embodiments, the oxidation may be performed in a separate step (e.g., by placing the interconnect in a furnace containing an oxygen-containing environment) before the interconnect is incorporated into a fuel cell stack.

In some embodiments, the second metal material may be substantially completely oxidized (i.e., oxidized throughout the thickness of the layer of the second metal material) to form the protective layer over the first metal material. The step of subjecting the interconnect to an oxygen-containing environment at elevated temperature may also partially oxidize the first metal material of the interconnect, including within the internal volume (i.e., pores) of the first metal material, causing the pores to fill and reducing the porosity and thus the gas permeability of the interconnect.

In other embodiments, the second metal material may be partially oxidized such that a layer of un-oxidized second metal material is located between the protective layer and the first metal material of the interconnect.

Figure 8:
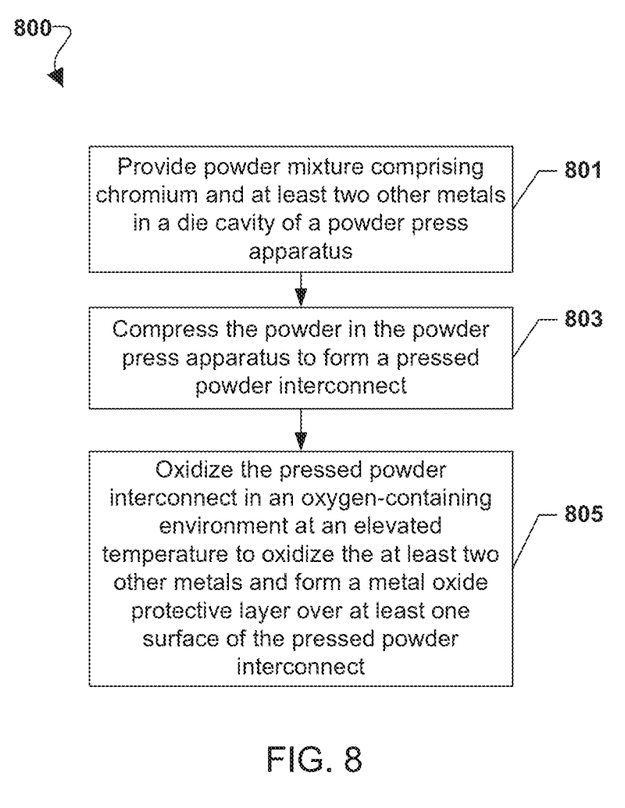
FIG. 8 is a flow diagram illustrating a method for fabricating an interconnect for a fuel cell stack according to another embodiment.

Another embodiment method 800 for fabricating an interconnect for a fuel cell stack is illustrated in the flow diagram of FIG. 8. In this method, a powder mixture comprising chromium and at least two other metals (e.g., manganese and cobalt) are compressed in a powder press apparatus to form a pressed powder interconnect, and the at least two other metals are oxidized to form a metal oxide (e.g., manganese cobalt oxide) protective layer over a surface of the interconnect. In block 801 of FIG. 8, a powder mixture comprising chromium and at least two other metals are provided in a die cavity of a powder press apparatus, such as shown in FIGS. 2A and 2B. In embodiments, the at least two other metals comprise manganese and cobalt. The powder mixture may optionally also include iron.

The composition of the powder mixture may result in a desired coefficient of thermal expansion (CTE) in the final interconnect. For example, the CTE of the interconnect may be matched to one or more other components of a fuel cell stack, such as the fuel cell electrolyte material in an electrolyte-supported fuel cell system. Cobalt provides similar CTE-matching properties as iron, and thus the iron in a conventional Cr—Fe alloy interconnect may be partially or completely substituted by cobalt in the powder mixture. In some embodiments, the powder mixture may include 0-1 wt % of iron, and the wt % of cobalt may be chosen to provide a final interconnect having a CTE what is within about 1% of the CTE of the solid oxide electrolyte of the fuel cell stack.

The fuel cell may be a solid oxide fuel cell having a ceramic electrolyte material, which may be a stabilized zirconia, such as scandia stabilized zirconia (SSZ) and/or yttria stabilized zirconia (YSZ). Alternatively, the electrolyte may comprise another ionically conductive material, such as a doped ceria. In some embodiments, the CTE of the compacted powder may be between about $7\times10^{-6}/°$ C. and $13\times10^{-6}/°$ C., such as $8.5$-$10.5\times10^{-6}/°$ C., including $9$-$10\times 10^{-6}/°$ C., such as about $9.62\times10^{-6}/°$ C., to match the $9.62\times10^{-6}/°$ C. CTE of SSZ. Alternatively, the CTE of the compacted powder can be between about $9.5$-$11.5\times10^{-6}/°$ C., such as $10$-$11\times10^{-6}/°$ C., to match the $10.5\times10^{-6}/°$ C. CTE of YSZ. For anode supported cells, the CTE of the compacted powder may be selected to match the anode CTE.

In embodiments, the power mixture may include pre-alloyed particles containing at least chromium, manganese and cobalt, and may optionally also include iron. The pre-alloyed particles may be formed using any of the methods described above. Alternatively, the powder mixture may include a mix of pre-alloyed manganese-cobalt particles with elemental chromium particles and/or pre-alloyed chromium-iron particles. In some embodiments, the powder mixture may include a mixture of elemental powders (particles) of each of the constituent metals (e.g., elemental chromium, manganese, cobalt and/or iron powders).

In embodiments, the powder mixture may have a substantially uniform composition within the die cavity such that the relative concentrations of the constituent metal materials (e.g., chromium, manganese, cobalt, etc.) of the powder mixture is not intentionally varied within the die cavity. In other embodiments, the composition of the powder mixture within the die cavity may be non-uniform. For example, the concentration of the at least two other metals (e.g., manganese and cobalt) may be relatively higher adjacent to an outer surface of the powder mixture than within an interior portion of the powder mixture in the die cavity. In this way, the interconnect may have a relatively higher concentration of the at least two other metals adjacent to an outer surface of the interconnect after the powders are compressed.

In block 803, the powder mixture may be compressed in the powder press apparatus to form a pressed powder interconnect. The powder mixture may be compressed (e.g., compacted) using any suitable powder metallurgy technique to form the pressed powder interconnect. The powders may be compressed with or without an organic binder (i.e., lubricant), and may optionally be compressed using high velocity compaction as described above. The compressing step may optionally be followed by a debindering step and/or a sintering step, such as described above with reference to FIG. 4. Alternately, such as when the powder mixture is compressed using a high velocity compaction method as described above, powder may be compressed without any organic binder being present in the mixture, and the debindering step may be omitted. In addition, the use of high velocity compaction may enable the interconnect to be incorporated into a fuel cell without performing a separate sintering step, as described above.

In block 805, the pressed powder interconnect may be oxidized in an oxygen-containing environment at an elevated temperature (e.g., greater than 100° C., such as 600-1000° C.) to oxidize the at least two other metals and form a metal oxide protective layer over at least one surface of the pressed powder interconnect. In other words, a surface oxide layer including oxides of the at least two other metals are formed on at least one surface of the interconnect, such as the air- or cathode-facing side of the interconnect when the interconnect is incorporated in a fuel cell stack. For example, where the powder mixture used to form the interconnect includes manganese and cobalt, the protective layer may comprise manganese cobalt oxide (MCO) material, such as an $(Mn, Co)_3O_4$ spinel. The oxidation may also reduce porosity within the interconnect and thus the gas permeability of the interconnect.

In some embodiments, the pressed powder interconnect may be placed into the fuel cell stack between two fuel cells and the oxidation may be performed in the fuel cell stack (e.g., as part of a stack annealing process), as described above with reference to FIG. 4. In other embodiments, the oxidation may be performed in a separate step (e.g., by placing the interconnect in a furnace containing an oxygen-containing environment) before the interconnect is incorporated into a fuel cell stack.

While solid oxide fuel cell interconnects, end plates, and electrolytes were described above in various embodiments, embodiments can include any other fuel cell interconnects, such as molten carbonate or PEM fuel cell interconnects, or any other metal alloy or compacted metal powder or ceramic objects not associated with fuel cell systems.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step of any embodiment described herein can be used in any other embodiment. The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method of fabricating an interconnect for a fuel cell stack, comprising:
   providing a first metal powder comprising at least one first metal material in a die cavity of a powder press apparatus;
   providing a second metal powder comprising at least one second metal material in the die cavity of the powder press apparatus, wherein the at least one second metal material is different than the at least one first metal material;
   compressing the first metal powder and the second metal powder in the powder press apparatus to form a pressed powder interconnect having a layer of the second metal material over a layer of the first metal material; and
   subjecting the pressed powder interconnect to an oxygen-containing environment at an elevated temperature to oxidize at least a portion of the at least one second metal material and form a metal oxide protective layer over a surface of the pressed powder interconnect.

2. The method of claim 1, wherein the first metal material of the first metal powder comprises at least about 90 wt % of chromium.

3. The method of claim 2, wherein the first metal material of the first metal powder comprises greater than 0 wt % and less than about 10 wt % of iron.

4. The method of claim 3, wherein the first metal material of the first metal powder comprises at least one of:
   (a) a mixture of elemental chromium powders and elemental iron powders; and
   (b) pre-alloyed particles comprising chromium and iron.

5. The method of claim 2, wherein the second metal powder is comprised of the second metal material comprising manganese and cobalt, and the second metal material is oxidized to form a manganese cobalt oxide protective layer over a surface of the pressed powder interconnect.

6. The method of claim 5, wherein the second metal material of the second metal powder comprises at least one of:
   (a) a mixture of elemental manganese powders and elemental cobalt powders; and
   (b) pre-alloyed powders comprising manganese and cobalt.

7. The method of claim 5, wherein the second metal material is substantially completely oxidized to form the manganese cobalt oxide protective layer over a layer of the first metal material.

8. The method of claim 7, wherein subjecting the pressed powder interconnect to the oxygen-containing environment at the elevated temperature oxidizes at least a portion of an interior volume of the layer of first metal material to reduce a porosity of the interconnect.

9. The method of claim 5, wherein the second metal material is partially oxidized such that a layer of the second metal material comprising manganese and cobalt is located between the manganese cobalt oxide protective layer and a layer of the first metal material.

10. The method of claim 1, wherein subjecting the pressed powder interconnect to an oxygen-containing environment comprises:
    incorporating the pressed powder interconnect into a fuel cell stack; and
    annealing the interconnect at the elevated temperature in the oxygen containing environment in the fuel cell stack to form the protective layer.

11. The method of claim 10, wherein:
    the pressed powder interconnect is incorporated into a fuel cell stack without first sintering the pressed powder interconnect; and the pressed powder interconnect has a cathode side comprising ribs and gas flow channels and an opposing anode side comprising ribs and gas flow channels.

12. The method of claim 1, wherein the first metal powder and the second metal powder are compressed using high velocity compaction.

13. The method of claim 12, wherein the pressed powder interconnect formed by high velocity compaction is incorporated into a fuel cell stack without first sintering the pressed powder interconnect.

* * * * *